US005823445A

United States Patent [19]

Sofer

[11] Patent Number: 5,823,445

[45] Date of Patent: Oct. 20, 1998

[54] FUEL INJECTOR WITH ELECTROMAGNETICALLY AUTONOMOUS SUB ASSEMBLY

[76] Inventor: Daniel Sofer, Av. Julio de Mesquita 959, Apto. 112, 13025-061 Campinas, Brazil

[21] Appl. No.: 750,123

[22] PCT Filed: May 23, 1995

[86] PCT No.: PCT/EP95/01946

§ 371 Date: Nov. 26, 1996

§ 102(e) Date: Nov. 26, 1996

[87] PCT Pub. No.: WO95/33134

PCT Pub. Date: Dec. 7, 1995

[30] Foreign Application Priority Data

May 26, 1994 [BR] Brazil .................................. 9401725-5

[51] Int. Cl.[6] .............................. B05B 1/30; F16K 31/02

[52] U.S. Cl. ................. 239/585.1; 239/584; 251/129.14; 251/129.15; 251/129.21

[58] Field of Search .................................... 239/569, 583, 239/584, 585.1; 251/129.14, 129.15, 129.21

[56] References Cited

U.S. PATENT DOCUMENTS

| | | | |
|---|---|---|---|
| 3,856,260 | 12/1974 | Giordana | 251/129.14 |
| 4,252,094 | 2/1981 | Draxler | 251/129.14 X |
| 4,474,332 | 10/1984 | Kaska | 251/129.14 X |
| 4,531,679 | 7/1985 | Pagdin | 239/585.1 |
| 4,938,451 | 7/1990 | Weaver et al. | 251/129.14 |
| 5,692,723 | 12/1997 | Baxter et al. | 239/585.1 X |

FOREIGN PATENT DOCUMENTS

| | | |
|---|---|---|
| 0480610 | 4/1992 | European Pat. Off. . |
| 2552847 | 4/1985 | France . |
| 3111327 | 1/1982 | Germany . |
| 2192427 | 1/1988 | United Kingdom . |
| 2196181 | 4/1988 | United Kingdom . |
| WO9004099 | 4/1990 | WIPO . |
| WO9203650 | 3/1992 | WIPO . |
| WO9423195 | 10/1994 | WIPO . |

*Primary Examiner*—Andres Kashnikow
*Assistant Examiner*—Robin O. Evans

[57] ABSTRACT

The fuel injector comprises a solenoid wound around a bobbin which can be energized through electrical connections, a guideless magnetic valve member, a valve seat, a magnetic core, at least one magnetic coupling element, a fuel inlet tube and an external housing. The guideless magnetic valve member, the valve seat, the magnetic core, the at least one magnetic coupling element, the solenoid, the bobbin and the electrical connections form an electromagnetically autonomous sub assembly which comprises the entire magnetic circuit and also all the electrical components of the finished injector. The solenoid and bobbin are lodged in a spaced defined between that at least one magnetic coupling element and the magnetic core and the sub assembly is possibly tested and calibrated extensively prior to the obtention of the finished fuel injector.

16 Claims, 10 Drawing Sheets

FUEL INJECTOR WITH ELECTROMAGNETICALLY AUTONOMOUS SUB ASSEMBLY

BACKGROUND OF THE INVENTION

The present invention relates to an electromagnetic fluid valve especially applicable in fuel injectors for internal combustion engines. More particularly, this invention relates to a fuel injector that uses an unguided spherical magnetic valve member as shutter, said valve member being biased to its closed position mainly by hydrodynamic forces.

Unguided spherical valve members have been used to provide high performance operation to fuel injectors at a lower production cost. And, among known fuel injectors using unguided spherical valve members, some designs use hydrodynamic forces to bias the shutter to the closed position, due to the high reliability and overall simplicity that this biasing force ensures. These features have enabled the obtention of lower cost valve assemblies.

Examples of these latter are disclosed in EP-A-0063952 and EP-B-0572428. EP-A-0063952 discloses a fuel injector comprising a hollow body, a solenoid core, which is one of the magnetic poles of the electromagnet, a guideless spherical shutter positioned within an aperture in a manner that the greatest cross sectional area of said shutter is always positioned within said aperture, being that the periphery of said aperture forms the other magnetic pole of the injector, so that the magnetic flux will flow from the solenoid core through the shutter to the periphery of the aperture then through the body of the injector. EP-B-0572428 discloses a fuel injector comprising a guideless spherical shutter seatable on a magnetic valve seat to stop the flow of fuel through the injector, a magnetic core and a body, being that the magnetic flux flows from the magnetic core to the shutter, through the magnetic valve seat and through the body of the fuel injector.

In these examples of fuel injectors featuring unguided valve members, the housing is part of the active portion of the fuel injector, since it is responsible for closing the magnetic circuit. It has been found, however, that having the housing as part of the active portion of the injector has drawbacks. First of all, it implies that each injector in the production line can only be tested and calibrated once it has been completely assembled, for only at this point in the manufacturing sequence is the injector operational. Moreover, an external metal housing implies relatively high material quantities and precision machining. As a result, although the concept of the injectors disclosed in these patents lowered the costs of the valve assembly, they did very little for the cost of the overall assembly of the fuel injector.

U.S. Pat. No. 5190223 discloses an injector which may, in one of its possible embodiments, use an unguided magnetic valve member as a shutter, which has a non-magnetizable casing solidly joined to the magnetic pole and the valve seat, forming a cartridge placed inside the housing, being that the magnetic return is by way of at least one magnetic return element, which may be formed as a cap open on one side or as a bracket. Calibration of an injector according to U.S. Pat. No. 5190223 is obtained by changes in a calibration air gap existing between the magnetic pole and the return element.

In such a fuel injector, a certain improvement to the assembly procedure is achieved, thanks to the cartridge assembly, however, the use of non-magnetizable material as the supporting structure of said cartridge assembly will result in poor magnetic response due to eddy-current generation in said supporting structure. Moreover, the cartridge assembly cannot be separately tested for electromagnetic behaviour, since the electromagnetic behaviour of the injector will only be determined by the finished assembly, including the solenoid, the return element and, in a very sensitive manner, by the exact air gap between the magnetic pole and the return element. As a result, only when the cartridge is assembled into the rest of the components of the magnetic circuit can said cartridge assembly be tested magnetically. Besides, since the cartridge assembly can only be tested for magnetic behaviour after it has been assembled to the return element, the only way to calibrate the magnetic behaviour of the entire injector is through the air gap between the return bracket and the magnetic pole. Unfortunately, the existence of any air gap between static components in a fuel injector will result in loss of performance due higher overall reluctances of the magnetic circuit, so, this means of calibration, even being the only one possible in this design, is not the most appropriate for a fuel injector. So, in such a fuel injector, neither assembly nor performance are fully optimized.

SUMMARY OF THE INVENTION

The present invention provides a fuel injector designed to improve magnetic behaviour, reduce weight and material quantities, simplify assembly and calibration procedures, allow miniaturization and reduce costs while maintaining or improving overall performance.

In order to optimize both the assembly procedure and the performance of the finished injector, a fuel injector according to the present invention relies on an entirely new assembly concept. Moreover, thanks to this new concept, which will be illustrated in detail in the following, a fuel injector according to the present invention can be extensively tested and accurately calibrated, including full electromagnetic testing, prior to the obtention of the finished injector, thus enabling such testing and calibrating at unprecedented low costs.

The basic concept of a fuel injector according to the present invention, which is responsible for the major industrial improvements that said injector brings about, is a unique sub assembly, which is electromagnetically autonomous.

A preferred fuel injector according to the present invention features a sub assembly which includes a solenoid, wound around a bobbin, a magnetic core, a spherical shutter, a valve seat and one or more magnetic coupling elements. This electromagnetically autonomous sub assembly, which includes the entire magnetic circuit of the finished injector and also the electrical means to energize said magnetic circuit, can be extensively tested and calibrated during the manufacturing sequence, in appropriately designed test rigs, where the lack of tightness due to the fact that the sub assembly is not a finished injector can be overcome.

This electromagnetically autonomous sub assembly is extremely cheap to obtain, since it requires no precisely machined components. Moreover, any residual air gaps between static components of the sub assembly can be eliminated during the manufacturing procedure, through pressing, welding or other suitable method. As a result, very low overall reluctances may be achieved, contributing to high electromagnetic performance.

Since the sub assembly can be tested independently for its magnetic behavior, which is of great importance to the overall response of the finished fuel injector, very high part-to-part repeatability is obtainable in the mass production of the injector, at unprecedented low costs.

Housing requirements are, thus, limited to mechanical support of the sub assembly, linking with the fuel supply, ensuring overall tightness,.and, eventually, other specific functions, such as optional atomizing air inlets. Thus, the housing can be obtained in different manners, including molded plastic. And, among the various possibilities for the housing, one that stands out is that of having a common housing for more than one electromagnetically autonomous sub assembly, so that a multi valve assembly is achieved, enabling many advantages in the installation of the injectors in the engine.

The electromagnetically autonomous sub assembly optimizes the assembly and manufacturing procedure of a fuel injector, while allowing, at the same time, extremely high performances to be achieved.

BRIEF DESCRIPTION OF THE DRAWINGS

Further advantages and characteristics of a fuel injector according to the present invention will become evident from the following detailed description and with reference to the accompanying drawings, given only by means of non-limiting example, wherein.

DETAILED DESCRIPTION OF THE INVENTION

Figure 1:
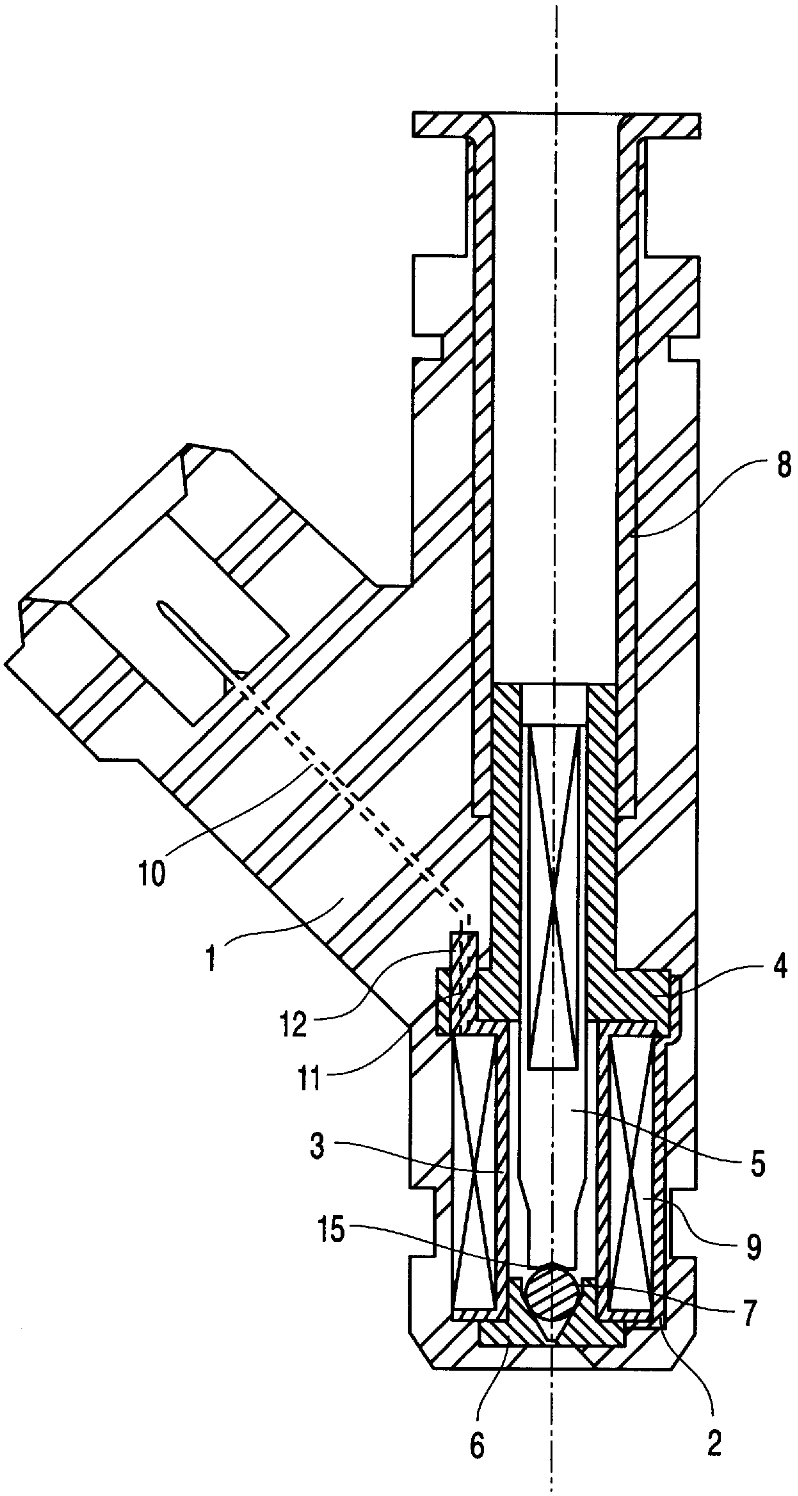
FIG. 1 is a cross section of one possible embodiment of a finished fuel injector according to the present invention.

FIG. 1 shows a preferred embodiment of a fluid injector according to the present invention. In this embodiment, a magnetic coupling element 2, made of one or more strips of magnetic material is firmly connected to a valve seat 6. A guideless magnetic valve member in the form of a spherical valve member or shutter 7 is placed, at least partially, within the cavity defined by the valve seat 6, the shape of said cavity being determined according to the specific needs of the injector. A magnetic core 5 has the core extremity 15 shaped as concave with the scope of improving the magnetic behaviour of the injector and in order to allow very low contact pressures at the end of the opening stroke. It is also possible to provide the core extremity 15 with grooves of convenient geometry and direction so as to create the required fluid dynamic effects during the valve's operation. The core 5, is positioned through a core supporting element 4, which, as will be shown below, allows calibration of the valve's characteristics during the assembly procedure. The core supporting element 4 provides the magnetic link between the magnetic coupling element 2 and core 5. In this embodiment, the core supporting element 4 interacts with the bobbin 3 so that the electrical connections 10 pass through specific passage holes 11 created in the core supporting element 4 in such a way that short circuit between connections 10 is prevented. In this preferred embodiment this result is achieved by insulating portions 12 sticking out of the bobbin 3.

Figure 2:
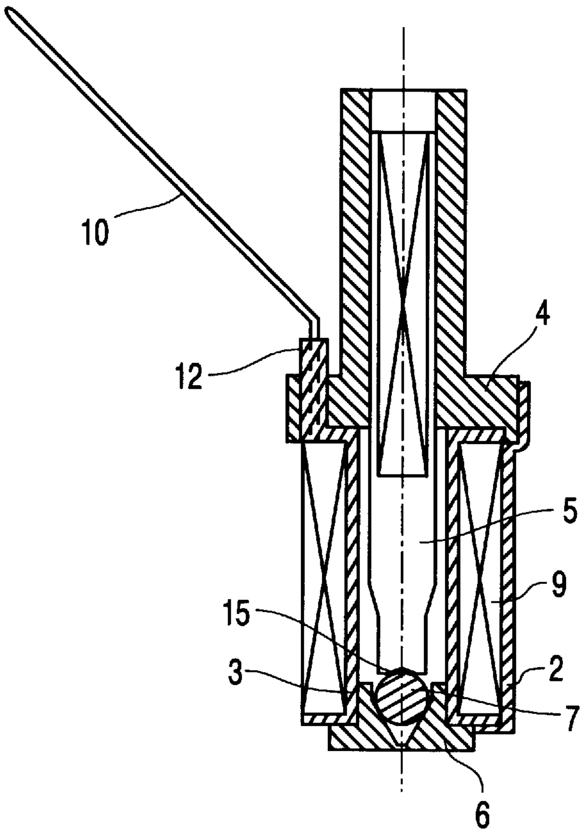
FIG. 2 is the cross section of one possible embodiment of the electromagnetically autonomous sub assembly of the injector shown in FIG. 1.

The entirely new assembly concept which characterizes the present invention becomes apparent in FIG. 2, where an electromagnetically autonomous sub assembly of the injector illustrated in FIG. 1 is depicted, prior to the completion of said injector. This sub assembly includes the magnetic coupling element 2, firmly linked to the valve seat 6 and to the core supporting element 4, the valve member 7, the bobbin 3, the solenoid 9 and the electrical connections 10, along with their insulating portions 12 and the magnetic core 5. In this example, assembly starts by joining valve seat 6 to the magnetic coupling element 2 permanently, so that not only their relative positions are fixed but that also a good magnetic flux flow between them is assured. The bobbin 3, made in this example of injected plastic material, is produced already inserted in the specific openings 11 in the core supporting element 4 and includes the electrical connections 10. Solenoid 9 is wound around bobbin 3 and the electrical winding's ends are linked to said electrical connections 10. Successively, core supporting element 4, together with solenoid 9, bobbin 3, electrical connections 10 and insulating portions 12 is firmly linked to the magnetic coupling element 2. The spherical valve member 7 is then positioned in the valve seat 6 and the magnetic core 5 is positioned with relation to the core supporting element 4. The magnetic core 5 can be displaced along the axis of the sub assembly, so that the stroke of the valve member 7 can be altered during assembly. The scope of such a variation is to allow precise calibration of the injector. Once the magnetic core 5 is positioned according to the desired calibration, its position is fixed permanently so as to guarantee that the valve's characteristics remain unchanged through time, besides guaranteeing an adequate flow of magnetic flux between core supporting element 4 and core 5.

The calibration of the fuel injector through the axial positioning of the magnetic core 5 is particularly effective, since it allows calibration to be achieved without the presence of air gaps between static components of the magnetic circuit. Moreover, the cost of this operation is particularly low, since it is performed on the electromagnetically autonomous sub assembly. So, only those sub assemblies that are, after the calibration, operating according to the specifications made to the fuel injector will proceed in the production sequence to become finished injectors.

An outside housing 1, for example of plastic material (FIG. 1) is then injected around the electromagnetically autonomous sub assembly and its scope is to provide mechanical protection and means of connecting the functional part to the fuel supply line. Prior to the injection of the plastic housing 1 a fluid inlet tube 8 is added to the sub assembly.

Figure 3:
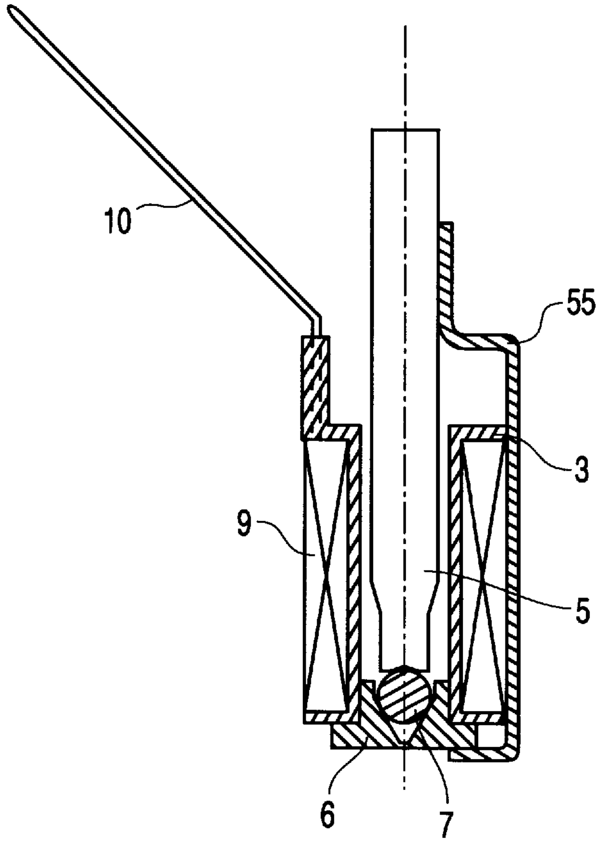
FIG. 3 is another possible embodiment of the electromagnetically autonomous sub assembly of the injector shown in FIG. 1.
Figure 4A:
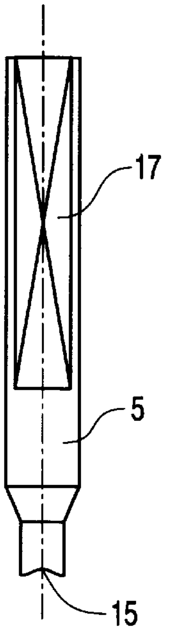
FIG. 4 illustrates some different possible configurations of the magnetic core of a fuel injector according to the present invention.
Figure 4B:
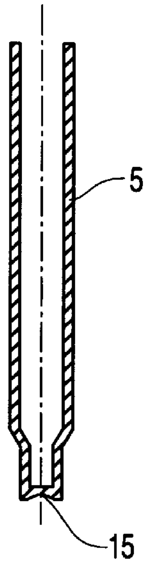
Figure 4C:
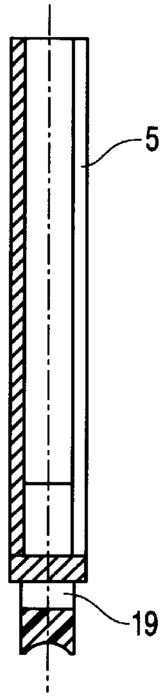
Figure 4D:
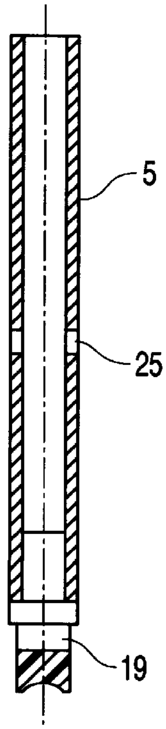
Figure 4E:
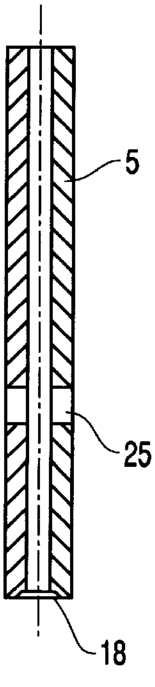
Figure 5A:
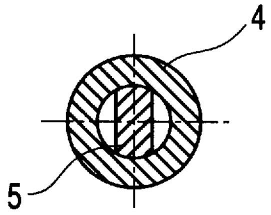
FIG. 5 illustrates transversal cut through views of the connection between the magnetic core and its supporting element.
Figure 5B:
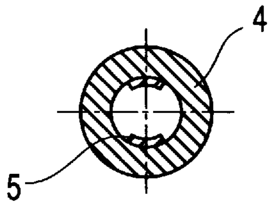
Figure 5C:
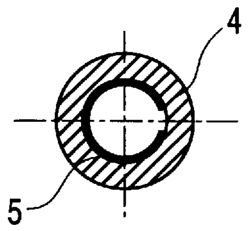
Figure 5D:
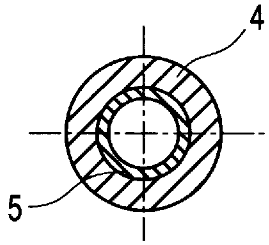

FIG. 3 illustrates a different possible embodiment for the electromagnetically autonomous sub assembly, where the magnetic coupling element and the core sustaining element constitute one single piece 55 which is linked directly to the magnetic core 5, resulting in a simpler and cheaper sub assembly. Calibration of the sub assembly is achieved through the setting of the relative position of the valve seat 6 with relation to the magnetic core 5, prior to the final linking of the piece 55 to the magnetic core 5. After calibration the piece 55 is firmly linked to the valve seat 6 and to the magnetic core 5 through pressing, welding or other suitable method.

FIG. 4 illustrates different examples of magnetic core 5. In FIG. 4*a* the magnetic core 5 is the one used in the injector shown in FIG. 1 and in the sub assembly depicted in FIG. 2. This magnetic core 5 is a made of solid magnetic material, with one or more flat surfaces 17. Said flat surfaces 17 are positioned facing the core supporting element 4 ( see FIGS. 1 and 2 ) and extend beyond it into the cavity defined by the bobbin 3, thus allowing the fluid to flow into said cavity defined by the bobbin 3. The core extremity 15 is shaped as a part spherical cavity. FIG. 4*b* depicts a magnetic core 5 obtained of stamped magnetic metal strip. This core 5 allows the fluid to flow freely into the cavity defined by the bobbin 3, and thus to the valve assembly. Various shapes can be obtained through the stamping procedure, and according to design requirements, the core extremity 15 may be flat or have a concavity stamped into it. FIG. 4*c* shows a core obtained from a strip of magnetic metal curved along its longitudinal axis until it forms a tube, open along one generatrix. The tip 19 is made of solid magnetic material and will be inserted into the open tube and fixed steadily to it. FIG. 4*d* shows a core obtained from a tube of magnetic metal, its tip 19 is similar to that of FIG. 4*c*. The tube has holes 25 along two or more generatrixes to allow the outflow of the fluid which will have entered into the tube through its open back end. The core of FIG. 4*e* is similar to that of FIG. 4*d* but with thicker walls so that the tip 19 made of solid magnetic metal can be omitted and the valve member 7 impinges directly on the chamfered extremity 18 of the core 5.

FIG. 5 shows transversal cut through views of the contact zone between core 5 and core supporting element 4 for the different types of cores illustrated in FIG. 4. In FIG. 5*a* the core is that of FIG. 4*a* and has two flattened surfaces 17. FIG. 5*b* shows the core exemplified in FIG. 4*b*. The core shown in FIG. 5*c* is that of FIG. 4*c*. FIG. 5*d* represents the transversal sections of the cores shown in FIGS. 4*d* and 4*e*.

Figure 6:
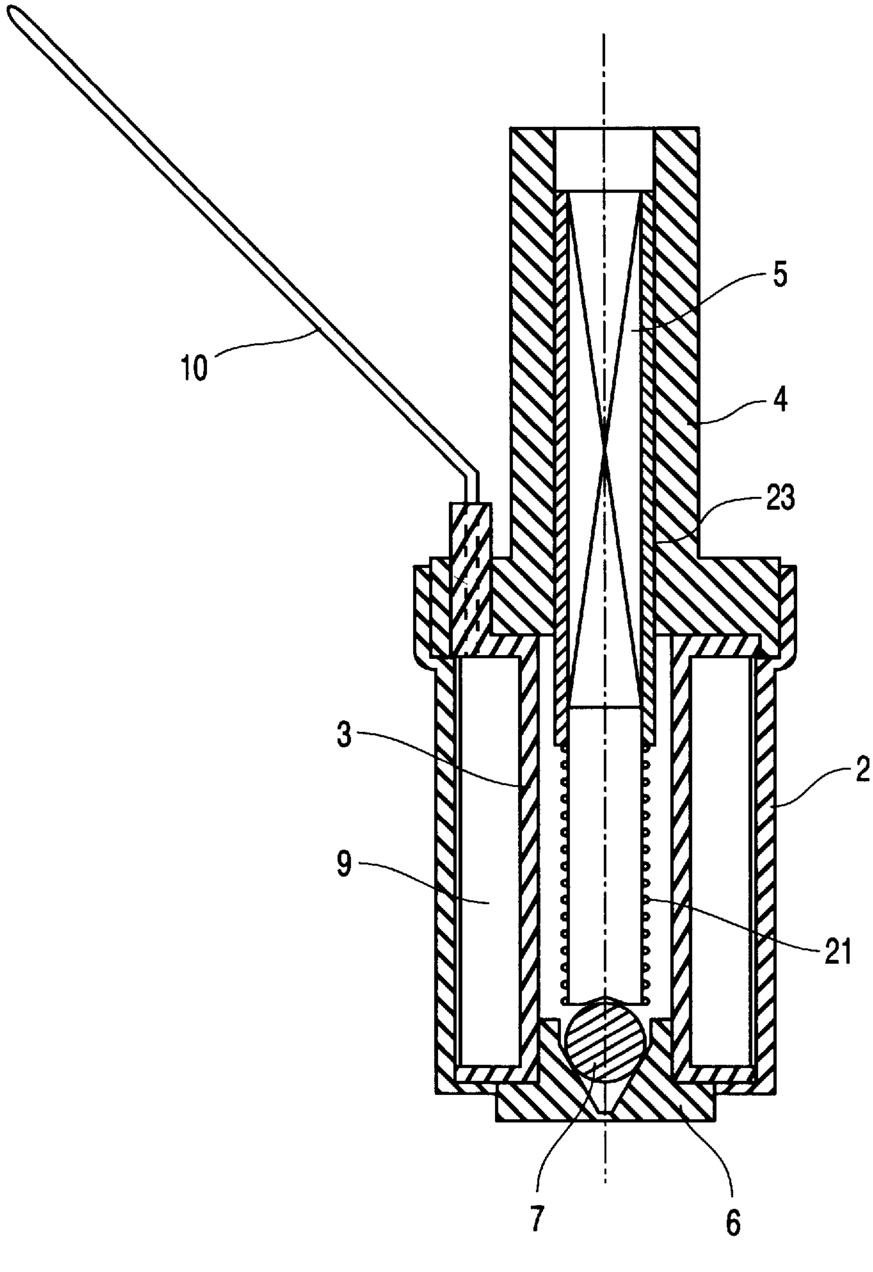
FIG. 6 is a further embodiment of a fuel injector according to the present invention, provided with a compression spring and a slide to calibrate the spring force.

FIG. 6 shows another embodiment of an electromagnetically autonomous sub assembly of a fuel injector according to the present invention which includes a compression spring 21 and a spring calibration slide 23 which can be positioned with relation to the other components of the injector, and thus determine the exact spring load to be exerted by spring 21. As can be noticed, in this embodiment the spring 21 and its calibration slide 23 are included in the sub assembly, so that even spring calibration can be performed on the sub assembly, not requiring the injector to be fully assembled. Once more the unique concept of the electromagnetically autonomous sub assembly reduces costs and allows a high quality calibration to be performed.

Figure 7A:
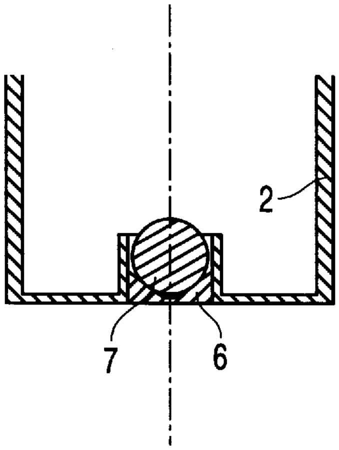
FIG. 7 illustrates some different examples of valve seats in a fuel injector according to the present invention.
Figure 7B:
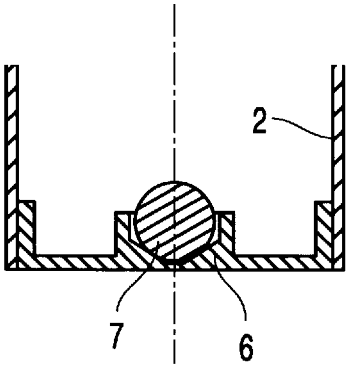
Figure 7C:
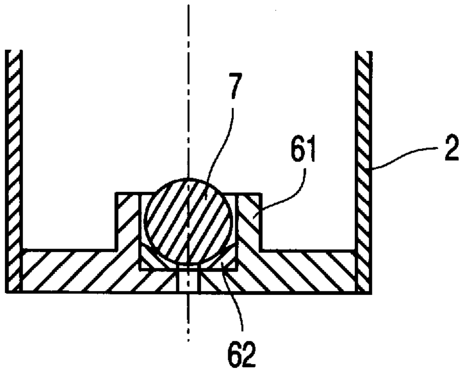

FIG. 7 shows different configurations of the valve seat 6 of a fuel injector according to the present invention. FIG. 7*a* shows a valve seat 6 made of non-magnetic material, which offers the possibility of adjusting the stroke of the valve member 7 through the axial positioning of said valve seat 6. This calibration possibility may be, in certain cases, preferred to the positioning of the magnetic core 5. FIG. 7*b* depicts a valve seat 6, made of magnetic material, which allows simplified assembly into the magnetic coupling element 2, especially if the magnetic coupling element 2 is shaped as a tube or cup, which is a further possibility for the element 2. FIG. 7*c* illustrates a valve seat 6 which is composed of two different portions, 61 and 62, each made of a different material, in order to allow the valve seat 6 as a whole to respond more appropriately to the needs of the fuel injector. For instance, the two portions may have different hardness, surface finish and magnetic behaviour.

Figure 8:
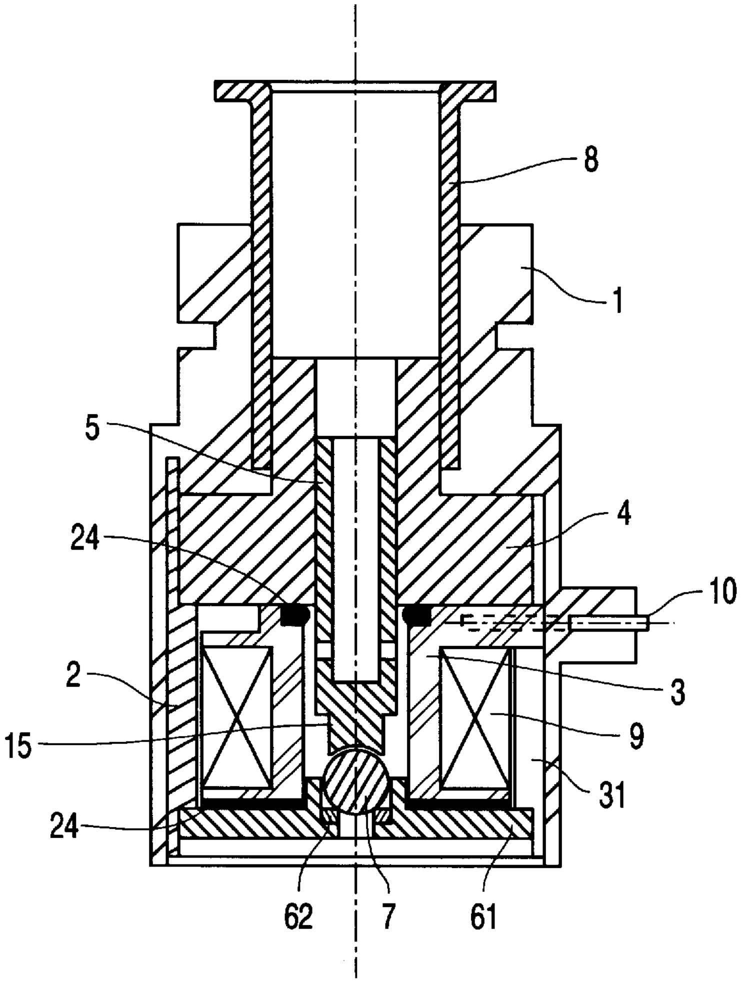
FIG. 8 shows a further embodiment of a valve according to the present invention, particularly adaptable for extreme miniaturization.

FIG. 8 shows a further embodiment of a fuel injector according to the present invention especially adaptable for use in high pressure fuel supply systems and where high fuel flows are required, such as in racing engines. It must be noticed that this embodiment is particularly compact and lightweight, being that, thanks to the overall efficiency of the magnetic circuit, where no static air gaps are present, the spherical shutter can have diameters down to 1 mm, implying in an overall injector weight of less than 10 grams. And this extreme miniaturization is achieved along with the possibility to have fuel flows of several liters per hour and the possibility to operate at pressures up to 15 bar. And, most remarkable, all this is achieved maintaining transient times below 0.3 ms for opening and closing. In this embodiment, the valve seat 6 is of the type shown in FIG. 7*c*, where the portion 62 is of hardened non-magnetic material. The portion 61 of the valve seat 6 is shaped so as to generate an opening on one side of the wall adjacent to the valve member 7 which favourably influences the fluido dynamical behaviour. Sealing elements 24 are included to guarantee improved fuel tightness at high fuel pressures. The shape of external housing 1 is also especially adapted for racing engines. An air inlet duct 31 is provided in order to achieve pneumatic atomization of the fuel spray.

Figure 9:
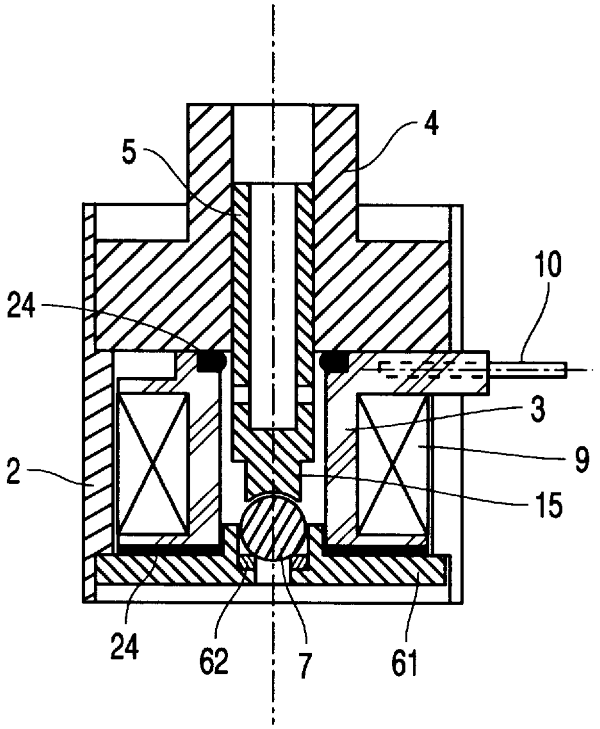
FIG. 9 is the electromagnetically autonomous sub assembly of the valve in FIG. 8.

FIG. 9 Shows the electromagnetically autonomous sub assembly of the injector illustrated in FIG. 8.

Figure 10:
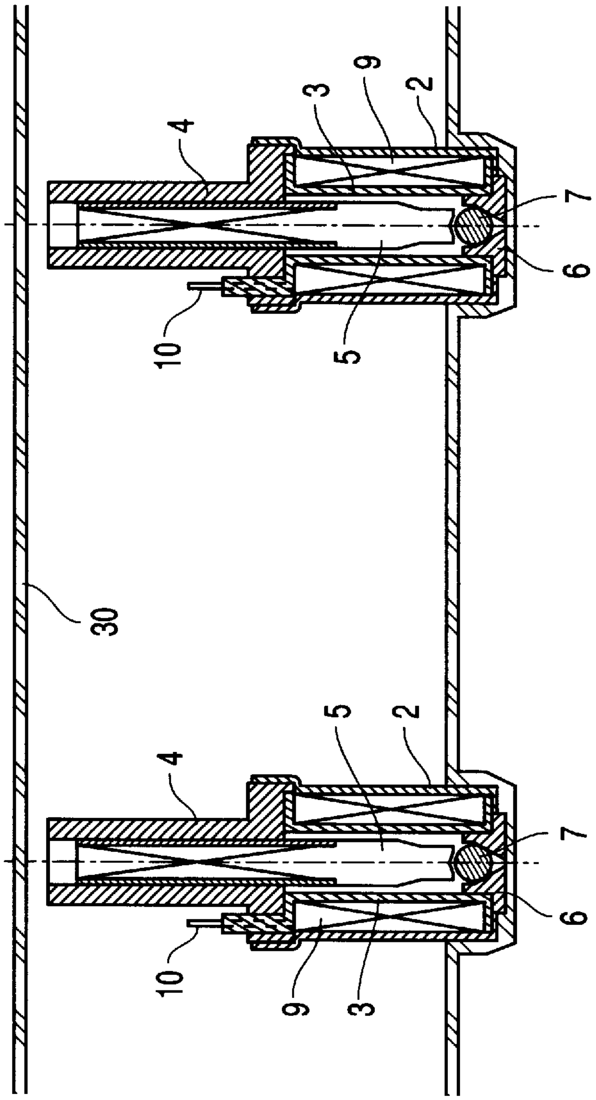
FIG. 10 illustrates an external housing holding more than one electromagnetically autonomous sub assembly, in order to obtain a multi-valve assembly.

FIG. 10 illustrates a multi-injector assembly, where more than one electromagnetically autonomous sub assemblies are placed into a common housing 30. In this case, since they are not to become finished injectors, the electromagnetically autonomous sub assemblies are not provided with individual finishing parts and housings. Among the possibilities offered by a multi-injector assembly are assemblies for feeding natural gas to high displacement engines, where several injectors are always present and module assemblies, where instead of having individual fuel injectors for each cylinder of the engine a multi-injector module is simply mounted into the air intake manifold of the engine, thus simplifying the assembly of the engine itself. Moreover, along with simplified mounting on the engine, a multi-injector assembly offers significant cost reductions, since each injector does not have to be finished separately. The low cost, tested and calibrated electromagnetically autonomous sub assemblies are simply placed in a common housing 30.

What is claimed is:

1. A fuel injector comprising a solenoid (9), wound around a bobbin (3), which can be energized through electrical connections (10), a guideless magnetic valve member (7), a valve seat (6), a magnetic core (5), a magnetic core sustaining element (4), at least one magnetic coupling element (2), a fuel inlet tube (8) and an external housing (1), characterized in that the guideless magnetic valve member (7), the valve seat (6), the magnetic core (5), which is axially displaceable for calibration, the magnetic core sustaining element (4), the at least one magnetic coupling element (2), the solenoid (9), the bobbin (3) and the electrical connections (10) form an electromagnetically autonomous sub assembly without air gaps between static components of the magnetic circuit, which sub-assembly comprises the entire magnetic circuit and also all the electrical components of the finished injector said solenoid (9) and bobbin (3) being lodged in a space defined between the at least one magnetic coupling element (2) and the magnetic core (5), whereby said sub assembly can be tested and calibrated by the axial displacement of the magnetic core prior to the obtention of the finished fuel injector.

2. A fuel injector according to claim 1, wherein said sub assembly is mounted in said external housing (1) and said fuel inlet tube (8) supplies fuel to said electromagnetically autonomous sub assembly.

3. A fuel injector according to claim 1, characterized in that the at least one magnetic coupling element (2) is of magnetic metal strip, whereby undesired residual air gaps between the static components of the magnetic circuit can be eliminated through pressing, welding or other suitable method during the assembly procedure of the electromagnetically autonomous sub assembly.

4. A fuel injector according to claim 1, characterized in that the at least one magnetic coupling element and the magnetic core sustaining element form a single piece (55) of magnetic metal strip whereby undesired residual air gaps between the static components of the magnetic circuit can be eliminated through pressing, welding or other suitable method during the assembly procedure of the electromagnetically autonomous sub assembly.

5. A fuel injector according to claim 1, characterized in that the magnetic coupling element (2) is shaped as a tube or a cup, whereby undesired residual air gaps between the static components of the magnetic circuit can be eliminated through pressing, welding or other suitable method during the assembly procedure of the electromagnetically autonomous sub assembly.

6. A fuel injector according to claim 1, characterized in that the magnetic coupling element and the magnetic core sustaining element form a single piece shaped as a tube or a cup, whereby undesired residual air gaps between the static components of the magnetic circuit can be eliminated through pressing, welding or other suitable method during the assembly procedure of the electromagnetically autonomous sub assembly.

7. A fuel injector according to claim 1, characterized in that the valve seat (6) is made of two or more different materials.

8. A fuel injector according to claim 1, characterized in that the valve seat (6) is a single component made of magnetic material.

9. A fuel injector according to claim 1, characterized in that the valve seat (6) is a single component made of non-magnetic material.

10. A fuel injector according to claim 1, characterized in that said sub assembly further comprises a spring (21) and a dedicated spring slide (23), whereby the magnetic valve member (7) is biased by the spring (21) and separate spring force calibration may be achieved through the positioning of the slide (23).

11. A fuel injector according to claim 1, wherein at least two electromagnetically autonomous sub assemblies are mounted in a common housing (30), so as to obtain a multi-injector assembly.

12. A fuel injector according to claim 1, characterized in that the electromagnetically autonomous sub assembly is placed in a housing (1.30) with at least one inlet duct in order to achieve pneumatic atomization of the fuel spray.

13. A fuel injector according to claim 1, characterized in that the magnetic core (5) is a single component.

14. A fuel injector according to claim 1, characterized in that the magnetic core (5) is provided of a core tip (19) which has one extremity shaped as a concavity.

15. A fuel injector according to claim 1, characterized in that its calibration is obtained by adjusting the relative longitudinal position of core extremity (15) or core tip (19) relative to the valve seat (6).

16. An electromagnetically autonomous sub assembly for a fuel injector comprising a valve seat, a bobbin having a solenoid coil thereon mounted on said valve seat, a guideless magnetic valve member movable into and out of engagement with said valve seat, a magnetic core supporting element mounted on said bobbin, a magnetic core movably supported by said core supporting element for engagement with said valve seat, at least one magnetic coupling element connected between said valve seat and said magnetic core supporting element and electrical connection means for connecting said coil to an external circuit whereby said sub assembly can be tested and calibrated prior to being incorporated in a fuel injector.

* * * * *